Sept. 6, 1960 R. D. ENGEL 2,951,934
WELDING TORCH
Filed Dec. 23, 1958 2 Sheets-Sheet 1

INVENTOR.
RALPH D. ENGEL
BY
ATTORNEYS

Sept. 6, 1960

R. D. ENGEL 2,951,934

WELDING TORCH

Filed Dec. 23, 1958

INVENTOR.
RALPH D. ENGEL

BY
ATTORNEYS

United States Patent Office 2,951,934
Patented Sept. 6, 1960

2,951,934

WELDING TORCH

Ralph Dieter Engel, Union, N.J., assignor to Air Reduction Company, Incorporated, New York, N.Y., a corporation of New York Filed Dec. 23, 1958, Ser. No. 782,474

10 Claims. (Cl. 219—130)

This invention pertains to the welding art in general and, more particularly, to an improved torch for use in inert gas shielded electric arc welding and fusion cladding procedures.

The torch of this invention is especially adapted for use in the related fields of electric arc welding and and fusion cladding wherein a consumable electrode or indeterminate length is continuously fed toward a work piece to be welded or clad. The electrode is electrically energized through the medium of a contact tube positioned within the torch and an arc is struck and maintained between the electrode and the work piece to produce necessary welding heat and effect deposition of electrode material on the work piece. An envelope of shielding gas, usually helium, argon or a mixture thereof, is maintained around the arc and the weld puddle to obtain desired welding conditions.

One of the principal features of this invention resides in the provision of a welding torch having incorporated therein an improved electrode guide means to enable use of extended electrode stickouts. The expression "electrode stickout" is well known to the art and refers to the portion of the electrode which extends or sticks out beyond a welding torch current contact means.

The electrode guide means of this invention, as will be evident from the annexed drawings and the detailed description that follows, is in the nature of an assembly of parts positioned wholly within the outer confines of the torch and including an electrically insulated guide tube which is located between the electrode contact tube and the free end of the torch nozzle and is spaced from the contact tube and the nozzle. The guide tube is water cooled. Also, the shielding gas, which is transmitted by the torch to the region of the arc, envelops the exposed outer surfaces of the guide tube and tends to transmit heat generated by the torch away from the guide tube. The guide tube assembly is so constructed and arranged as to permit of ready replacement of a guide tube having an inner diameter for accommodating a particular size electrode with a like tube for accommodating a different size electrode.

Another feature of the invention is that two or more torches, constructed in accordance with the invention, may be arranged in side by side parallel relation and joined together to obtain a unitary torch structure which is capable of simultaneously forming multiple welds or clads. Such a torch structure affords a number of worthwhile advantages. For example, when the structure is used for cladding purposes, the advantages include the following:

(1) Wider areas may be clad with each pass over the structure than with each pass of a single torch.

(2) More uniform clads are obtained by reducing the number of overlaps which would result from the use of a single torch.

(3) There is more uniform heat distribution in the work piece during cladding thereby minimizing the possibility of deformation of the work piece due to the creation of non-uniform thermal stresses therein.

(4) Labor costs are materially reduced.

The primary object of this invention is to provide a welding torch which includes an improved electrode guide assembly to enable use of extended electrode stickouts.

Another object of the invention is to provide an electrically insulated, water cooled, electrode guide assembly which properly supports and guides a welding electrode at a point in advance of the current supply to the electrode.

Another object of the invention is to provide a welding torch electrode guide assembly which includes a removable guide tube for accommodating an electrode of selected size and which is readily replaceable by a like guide tube for accommodating an electrode of different size.

A further object of the invention is to provide a welding structure comprising a plurality of torches constructed in accordance with the invention and arranged in side by side parallel relationship, the welding torches being joined together and operable simultaneously and in unison.

The enumerated objects and other objects, together with the advantages of this invention, will be readily understood by persons skilled in the art from the following detailed description taken in conjunction with the annexed drawings which describe and illustrate a preferred embodiment of the invention.

In the drawings wherein like reference numerals denote corresponding parts throughout the several views:

Fig. 4 is a view, on a reduced scale, taken along line 4—4 of Fig. 3;

Fig. 5 is a view taken along line 5—5 of Fig. 3;

Fig. 6 is a view taken along line 6—6 of Fig. 3; and

Fig. 7 is a view taken along line 7—7 of Fig. 2.

Figure 1:
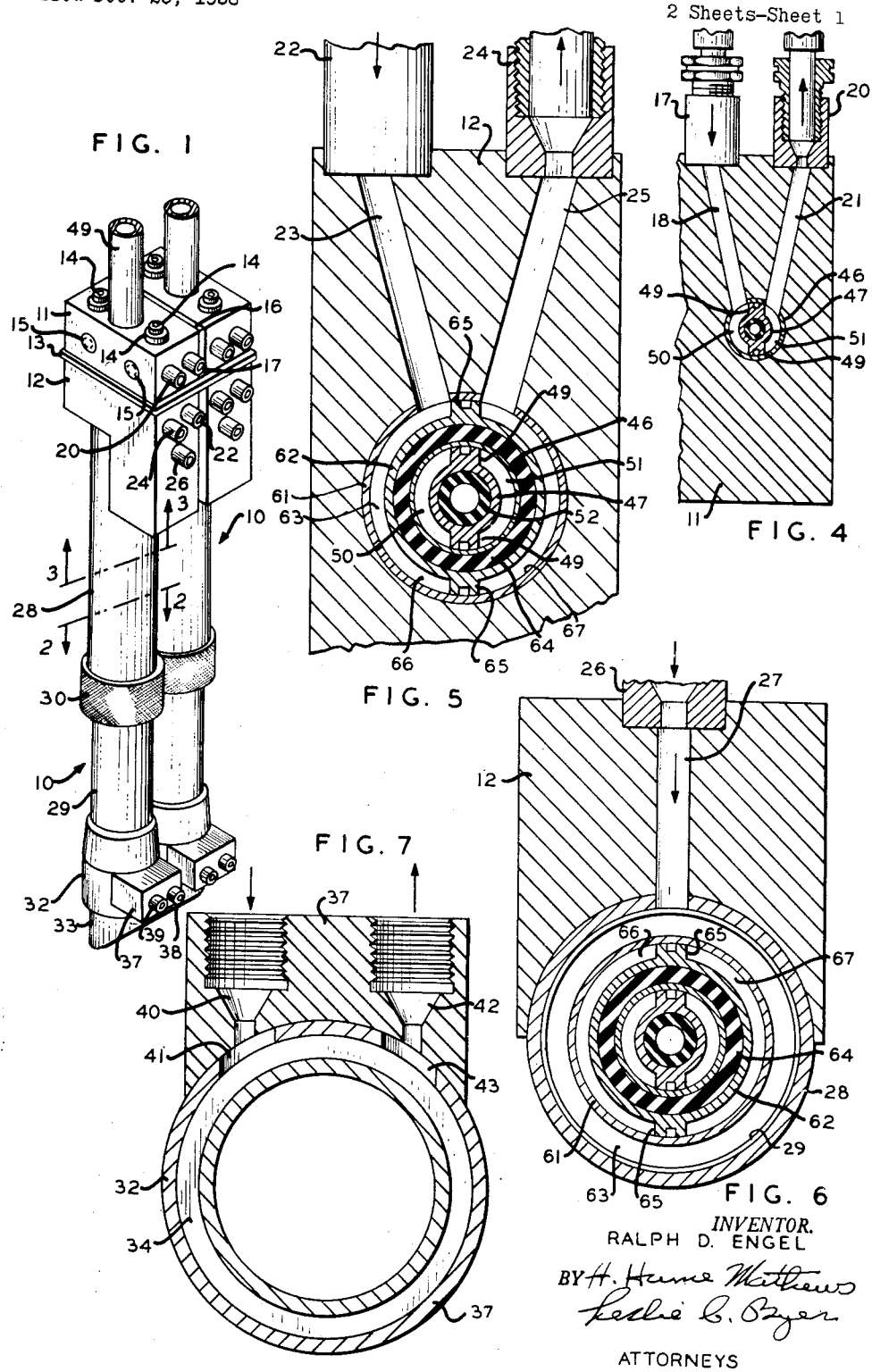
Fig. 1 is an isometric view of a dual welding torch unit constructed in accordance with the invention.

Referring initially to Fig. 1, I have illustrated therein a dual arc welding structure consisting of a pair of identical welding torches 10. These torches are joined together to obtain a unitary construction, as will be described further along herein, and are adapted to be operated simultaneously and in unison.

Each welding torch 10 comprises a block assembly which includes an upper metal block 11, a lower metal block 12 and an electrical insulating gasket 13 interposed therebetween. Blocks 11 and 12 are joined together by screws 14 which extend through electrical insulating sleeves (not shown) in block 11 and engage taps in block 12. The illustrated block arrangement serves as a support for other parts of the torch.

The torches 10 are adapted to be disposed in the illustrated side by side parallel relationship and joined together by bolts 15 which extend through insulating sleeves in the upper blocks. Blocks 11 of the torches are electrically insulated from each other by a gasket 16.

Block 11 is provided with a coolant inlet nipple 17, which communicates with an inlet passage 18, and a coolant discharge nipple 20, which communicates with an outlet passage 21 (Fig. 4). A welding current lead (not shown) is adapted to be inserted in the block assembly by way of nipple 17. Lower block 12 is provided with a coolant inlet nipple 22, which communicates with an inlet passage 23, and a coolant discharge nipple 24, which communicates with an outlet discharge passage 25 in that block (Fig. 5). Block 12 is also provided with a shielding gas inlet 26 which communicates with a passage 27 (Fig. 6).

Figure 2:
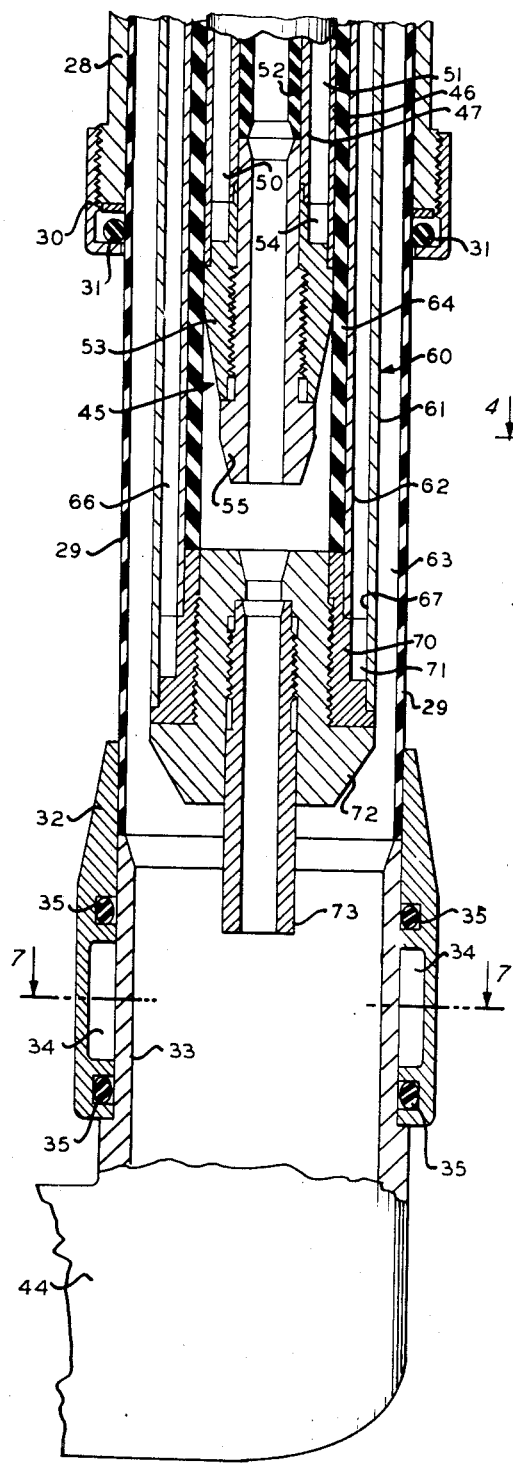
Fig. 2 is a view in enlargement taken along line 2—2 of Fig. 1.
Figure 3:
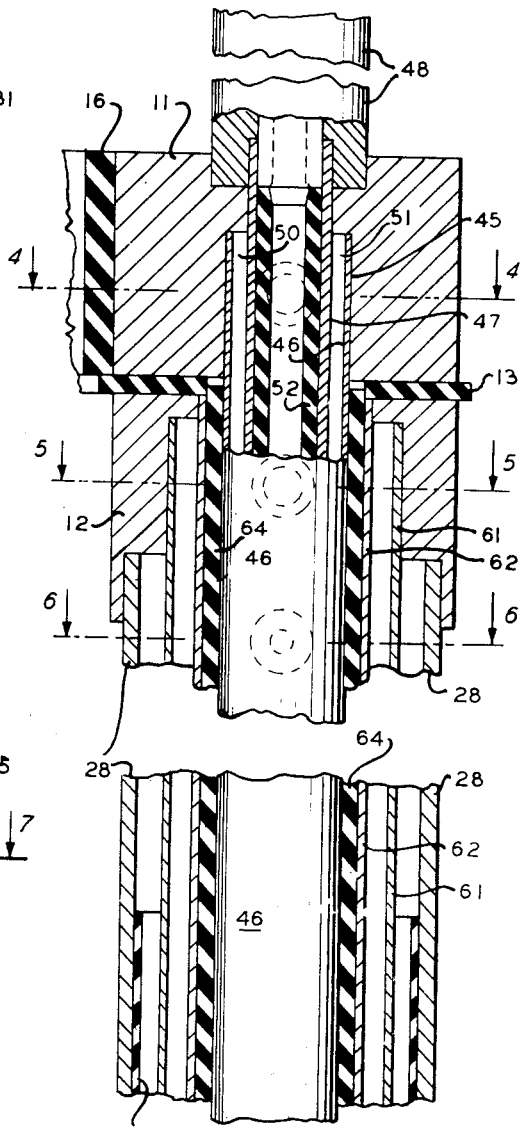
Fig. 3 is a view in enlargement taken along line 3—3 of Fig. 1.

A sectional outer barrel is secured to and extends downwardly from the block assembly. The outer barrel consists of an upper metal tubular section 28, which forms a fluid-tight metallic seal with lower block 12, and a lower tubular section 29 which is partly telescoped in section 28 and forms a fluid-tight seal therewith through the medium of a knurled clamping ring 30 and an O type sealing ring 31. Section 29 constitutes an adjustable extension of section 28. As is best shown in Fig. 2, clamping ring 30 is internally threaded for engagement with external threads on the lower end of tubular section 28. Tubular section 29 is made of a suitable material such as fiber, for protection of the operator and for satisfactory operation of the torch in use.

Secured to the lower end of tubular section 29 is a nozzle holder tube 32. A nozzle 33 is positioned concentrically in tube 32 and abuts the lower end of tubular section 29. Holder tube 32 and nozzle 33 define an annular coolant chamber 34 and an adequate seal is effected by a pair of O type sealing rings 35. A block 37 (Fig. 1) is affixed to holder tube 32, preferably by brazing. This block is provided with a coolant inlet nipple 38 and a coolant outlet nipple 39. Nipple 38 communicates with chamber 34 by way of an inlet passage 40 in block 37 and a port 41 in nozzle holder 32 (Fig. 7). Nipple 39 communicates with the coolant chamber by way of a second passage 42 in block 37 and a second port 43 in nozzle holder 32. It will be observed from an examination of Figs. 1 and 7 that a fluid coolant, preferably water, may be readily circulated through annular chamber 34 through nipples 38 and 39 and associated passages to effectively cool the nozzle. A bridging plate 44 (Fig. 2) may be secured to the nozzles in any manner known to the art and thereby maintain the lower portions of the torches in the relative position shown in Fig. 1.

Reference is next had to Figs. 2 through 5 which illustrate details of construction of an inner barrel assembly 45 that will now be described. This assembly comprises a pair of concentric metal tubes, namely an outer tube 46 and an inner tube 47. The upper end of inner tube 47 is metallically sealed to a hollow fitting 48 through which a consumable welding electrode (not shown) is adapted to be introduced into the torch. The inner tube has a pair of diametrically opposed fins 49 which divide the space between tubes 46 and 47 into longitudinal coolant passages 50 and 51. As is best shown in Fig. 4, passage 50 communicates with block passage 18 while passage 51 communicates with block passage 21. Inner tube 47 is provided with an internal cylindrical liner 52 which is made of a suitable electrical insulating material. An electrode contact tube holder 53 is affixed to and extends across the lower ends of tubes 46 and 47. As is illustrated in Fig. 2, holder 53 is in the nature of a closure means which extends across the lower extremities of these tubes and defines an annular chamber 54 therewith. This chamber is in communication with passages 50 and 51 so that a fluid coolant, such as water, which is introduced to the torch by way of nipple 17 flows through block passage 18, then downwardly through passage 50, through chamber 54, then upwardly through passage 51, next outwardly through passage 21 and is finally discharged through nipple 20. This coolant serves to cool holder 53 and an electrode contact tube 55 which is threadedly engaged by the holder. Electrode contact tube 55 is adapted to make electric contact between the electrode and tubes 46 and 47.

The electrode guide tube assembly of this invention is generally indicated by numeral 60 and is best shown in Figs. 2, 3, 5 and 6. Assembly 60 includes an outer metal tube 61 and an inner metal tube 62. These tubes are positioned within the outer barrel 28, 29 and surround the tubes of the inner barrel assembly 45. Tube 61 and the outer barrel define an annular space 63 which communicates with shielding gas inlet passage 27 in lower block 21 (Fig. 6). An electrical insulating sleeve 64 is interposed between the inner surface of tube 62 and the outer surface of tube 46. Tube 62 is provided with a pair of diametrically opposed fins 65 which divide the space between tubes 61 and 62 into coolant passages 66 and 67. As is indicated in Fig. 5, passage 66 communicates with lower block passage 23 while passage 67 communicates with passage 25 in that block.

A tubular fitting 70 is connected to the lower ends of tubes 61 and 62 and defines an annular chamber 71 with tube 61. Chamber 71 is in communication with passages 66 and 67 and a liquid coolant, preferably water, which is supplied through nipple 22, flows through the various passages and openings in the guide tube assembly in the following order: nipple 22, block inlet passage 23, passage 66, chamber 71, passage 67, block outlet passage 25 and nipple 24. The coolant, in the course of flowing through the torch, effectively cools fitting 70 and the parts secured thereto. These parts are shown in Fig. 2 and comprise a tubular guide tube holder 72 and an electrode guide tube 73. Holder 72 is threadedly connected to fitting 70 while guide tube 73 is threadedly connected to holder 72. It will be observed that guide tube 73 may be readily installed or replaced and that its axial through opening is aligned with the axial through opening in electrode contact tube 55. The internal diameter of tube 73 is slightly greater than the diameter of the selected electrode to permit ready movement of the electrode therethrough and proper guidance of the electrode during such movement.

Each of the welding torches above described is thus seen to comprise an artificially cooled inner barrel assembly 45 through which an electrode is directed to an electrically conductive contact tube 55 after passing through an inner cylindrical liner 52 of insulating material. Current is supplied to contact tube 55 through spaced tubes 46 and 47 of this assembly 45 from block 11 to which a welding current lead is attached by way of nipple 17 which supplies coolant to the space between tubes 46 and 47 for passage lengthwise thereof and discharge through nipple 20. This inner barrel assembly is enclosed in an artificially cooled electrode guide tube assembly 60 terminating at its lower end in a guide tube 73 mounted in a holder 72 which in turn is mounted in a fitting 70 which closes the lower ends of spaced tubes 61 and 62 between which coolant flows through longitudinal passages lengthwise thereof from nipple 22 to nipple 24.

The electrode guide tube assembly is electrically insulated from the electrode contact inner barrel assembly by a sleeve 64 of insulating material. The concentric electrode contact and electrode guide barrels are enclosed in and concentric with a sectional outer barrel 28, 29 which is spaced therefrom to provide an annular passage 63 to which gas is supplied through a passage 27 in block 12 by way of nipple 26 for discharge to nozzle 33 of the welding torch which is also artificially cooled. The section 29 of this outer barrel assembly is made of insulating material to avoid a conductive connection between electrode guide tubes 73 of a pair of torches arranged in side parallel relation as above described.

The electrode guide means is wholly within the torch structure and the torch assembly provides for adjustments which will accommodate various electrode stickouts and electrodes of various sizes. The guide means and the electrode passing therethrough are completely shielded by the gas supplied through the torch to its terminal nozzle structure through which the arcing end of the electrode extends.

From the foregoing, it is believed that the objects, advantages, construction, operation and utility of my present invention will be readily comprehended by persons trained in the art, without further description. Although the invention has been herein shown and described in a simple and practicable form, it is recognized that certain parts or elements herein are representative of other parts or elements that may be used in substantially the same manner to accomplish substantially the same results. Therefore, it is to be understood that the invention is not to be limited to the exact details described herein, but is to be accorded the full scope and protection of the appended claims.

I claim:

1. In a welding torch, an upstanding outer barrel, a nozzle secured to the lower end of the outer barrel, an inner barrel assembly at least partly within and spaced from the outer barrel, said inner barrel assembly including an electrode contact tube which terminates above the lower end of the nozzle, said contact tube having a through opening, and an electrode guide tube assembly within the outer barrel and including an outer tube, an inner tube within the outer tube and surrounding the inner barrel assembly, closure means extending across the lower ends of the outer and inner tubes and defining therewith a chamber for a cooling fluid, and an electrode guide tube secured to the closure means, said guide tube being positioned between the contact tube and the lower end of the nozzle and being spaced from the contact tube and the nozzle, said guide tube having a through opening that is aligned with the opening in the contact tube.

2. In a welding torch, an upstanding outer barrel, a nozzle secured to the lower end of the outer barrel, an inner barrel assembly at least partly within and spaced from the outer barrel, said inner barrel assembly including an electrode contact tube which terminates above the lower end of the nozzle, said contact tube having a through opening, and an electrode guide tube assembly within the outer barrel and including an outer tube which is spaced from the outer barrel and defines therewith an annular passage for transmission of shielding gas, an inner tube within the outer tube and surrounding the inner barrel assembly, closure means extending across the lower ends of the outer and inner tubes and defining therewith a chamber for a cooling fluid, and an electrode guide tube secured to the closure means, said guide tube being positioned between the contact tube and the lower end of the nozzle and being spaced from the contact tube and the nozzle, said guide tube having a through opening that is aligned with the opening in the contact tube.

3. In a welding torch, an upstanding outer barrel, a nozzle secured to the lower end of the outer barrel, an inner barrel assembly at least partly within and spaced from the outer barrel, said inner barrel assembly including an electrode contact tube which terminates above the lower end of the nozzle, said contact tube having a through opening, an electrode guide tube assembly within the outer barrel and including an outer tube, an inner tube within the outer tube and surrounding the inner barrel assembly, closure means extending across the lower ends of the outer and inner tubes and defining therewith a chamber for a cooling fluid, and an electrode guide tube secured to the closure means, said guide tube being positioned between the contact tube and the lower end of the nozzle and being spaced from the contact tube and the nozzle, said guide tube having a through opening that is aligned with the opening in the contact tube, and means including an electrically non-conductive sleeve intermediate the inner tube and the inner barrel assembly for electrically insulating the guide tube assembly from the inner barrel assembly.

4. In a welding torch, an upstanding outer barrel, a nozzle secured to the lower end of the outer barrel, an inner barrel assembly at least partly within and spaced from the outer barrel, said inner barrel assembly including an electrode contact tube which terminates above the lower end of the nozzle, said contact tube having a through opening, an electrode guide tube assembly within the outer barrel and including an outer tube which is spaced from the outer barrel and defines therewith an annular passage for transmission of shielding gas, an inner tube within the outer tube and surrounding the inner barrel assembly, closure means extending across the lower ends of the outer and inner tubes and defining therewith a chamber for a cooling fluid, and an electrode guide tube secured to the closure means, said guide tube being positioned between the contact tube and the lower end of the nozzle and being spaced from the contact tube and the nozzle, said guide tube having a through opening that is aligned with the opening in the contact tube, and means including an electrically non-conductive sleeve intermediate the inner tube and the inner barrel assembly for electrically insulating the guide tube assembly from the inner barrel assembly.

5. In a welding torch, an upstanding outer barrel, a nozzle secured to the lower end of the outer barrel, an inner barrel assembly at least partly within and spaced from the outer barrel, said inner barrel assembly including an electrode contact tube which terminates above the lower end of the nozzle, said contact tube having a through opening, and an electrode guide tube assembly within the outer barrel and including an outer tube which is spaced from the outer barrel and defines therewith an annular passage for transmission of shielding gas, an inner tube within the outer tube and surrounding the inner barrel assembly, said outer and inner tubes defining a first longitudinal passage for receiving a cooling fluid and a second longitudinal passage for withdrawing the cooling fluid, a tubular fitting extending across the lower ends of the outer and inner tubes and defining an annular space with the outer tube, said annular space communicating with the first and second passages, and an electrode guide tube secured to the tubular fitting and projecting therebelow, said guide tube being positioned between the contact tube and the lower end of the nozzle and being spaced from the contact tube and the nozzle, said guide tube having a through opening that is aligned with the opening in the contact tube.

6. In a welding torch, an upstanding outer barrel, a nozzle secured to the lower end of the outer barrel, an inner barrel assembly at least partly within and spaced from the outer barrel, said inner barrel assembly including an electrode contact tube which terminates above the lower end of the nozzle, said contact tube having a through opening, an electrode guide tube assembly within the outer barrel and including an outer tube which is spaced from the outer barrel and defines therewith an annular passage for transmission of shielding gas, an inner tube within the outer tube and surrounding the inner barrel assembly, said outer and inner tubes defining a first longitudinal passage for receiving a cooling fluid and a second longitudinal passage for withdrawing the cooling fluid, a tubular fitting extending across the lower ends of the outer and inner tubes and defining an annular space with the outer tube, said annular space communicating with the first and second passages, and an electrode guide tube secured to the tubular fitting and projecting therebelow, said guide tube being positioned between the contact tube and the lower end of the nozzle and being spaced from the contact tube and the nozzle, said guide tube having a through opening that is aligned with the opening in the contact tube, and means including an electrically non-conductive sleeve intermediate the inner tube and the inner barrel assembly for electrically insulating the guide tube assembly from the inner barrel assembly.

7. In a welding torch, a support, an outer barrel carried by and extending downwardly from the support, a nozzle secured to the lower end of the outer barrel, an inner barrel assembly carried by the support and positioned at least partly within the outer barrel, said inner barrel assembly including a first outer tube, a first inner tube within the first outer tube, first closure means extending across the lower ends of the first outer and inner tubes and defining therewith a first chamber for a cooling fluid, said first chamber communicating with first inlet and outlet passages formed in the support, and an electrode contact tube secured to the first closure means and terminating above the lower end of the nozzle, said contact tube having a through opening, and an electrode guide tube assembly carried by the support and positioned within the outer barrel, said electrode guide assembly including a second outer tube, a second inner tube within the second outer tube and surrounding the first outer tube, second closure means extending across the lower ends of the second outer and inner tubes and defining therewith a second chamber for a cooling fluid, said second chamber communicating with second inlet and outlet passages formed in the support, and an electrode guide tube secured to the second closure means, said guide tube being positioned between the contact tube and the lower end of the nozzle and being spaced from the contact tube and the nozzle, said guide tube having a through opening that is aligned with the opening in the contact tube.

8. A welding torch, according to claim 7 wherein the second outer tube is spaced from the outer barrel and defines therewith an annular passage for transmission of shielding gas, said annular passage communicating with a third inlet passage formed in the support.

9. A welding torch according to claim 7 including means comprising an electrically non-conductive sleeve intermediate the first outer tube and the second inner tube for electrically insulating the guide tube assembly from the inner tube assembly.

10. A welding torch, according to claim 7 wherein the second outer tube is spaced from the outer barrel and defines therewith an annular passage for transmission of shielding gas, said annular passage communicating with a third inlet passage formed in the support, the torch also including means comprising an electrically non-conductive sleeve intermediate the first outer tube and the second inner tube for electrically insulating the guide tube assembly from the inner tube assembly.

References Cited in the file of this patent

UNITED STATES PATENTS

| | | |
|---|---|---|
| 2,289,938 | Smith | July 14, 1942 |
| 2,727,970 | Turbett | Dec. 20, 1955 |
| 2,768,280 | Renaudie | Oct. 23, 1956 |